Jan. 10, 1950    H. A. ABBOTT    2,494,275
COLLAPSIBLE CRATE
Filed Jan. 5, 1946    3 Sheets-Sheet 1
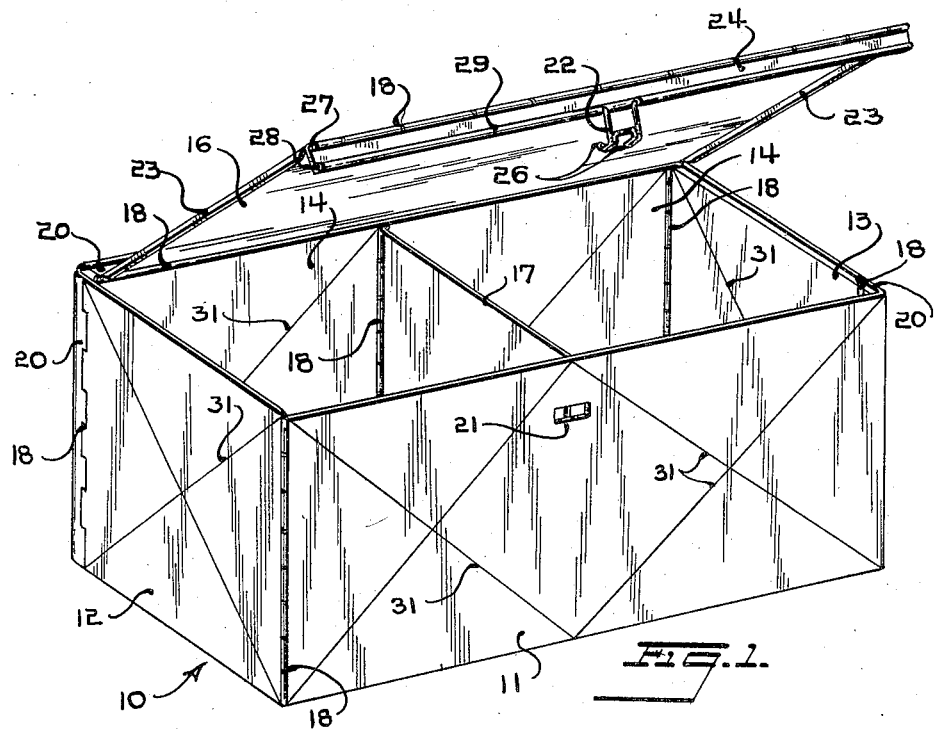
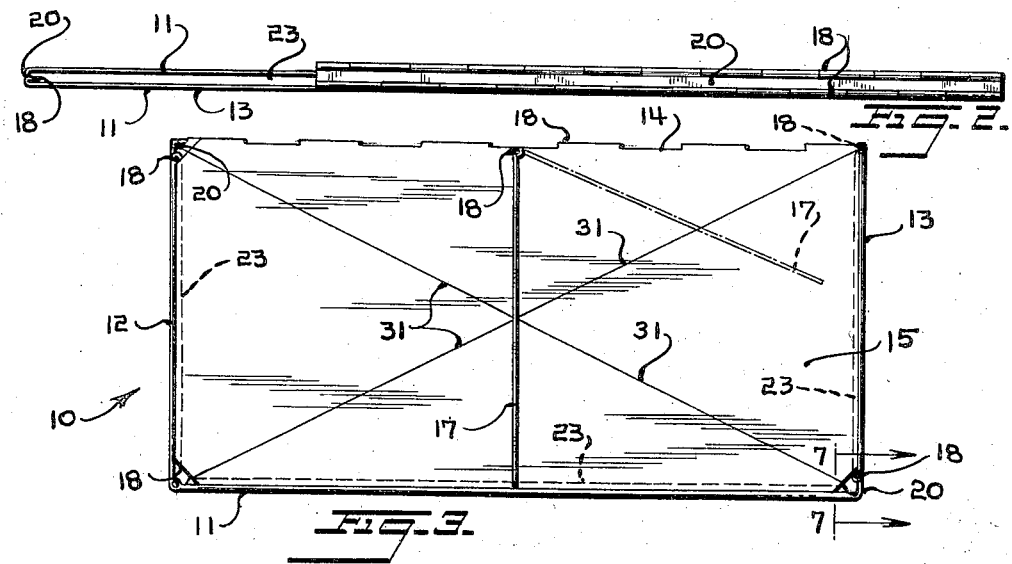
INVENTOR
HARRY A. ABBOTT
BY
ATTORNEY

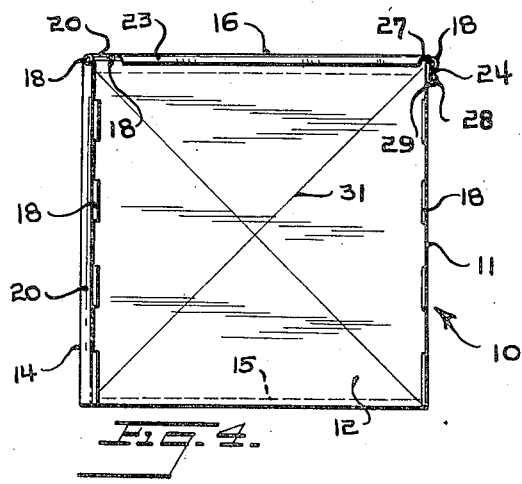
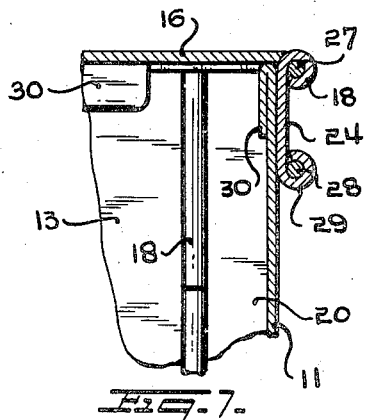
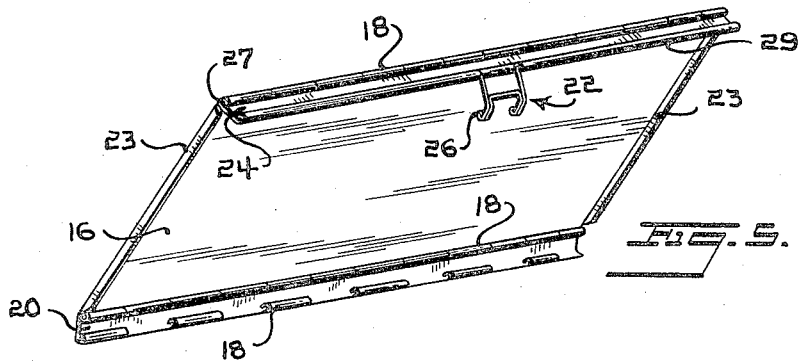
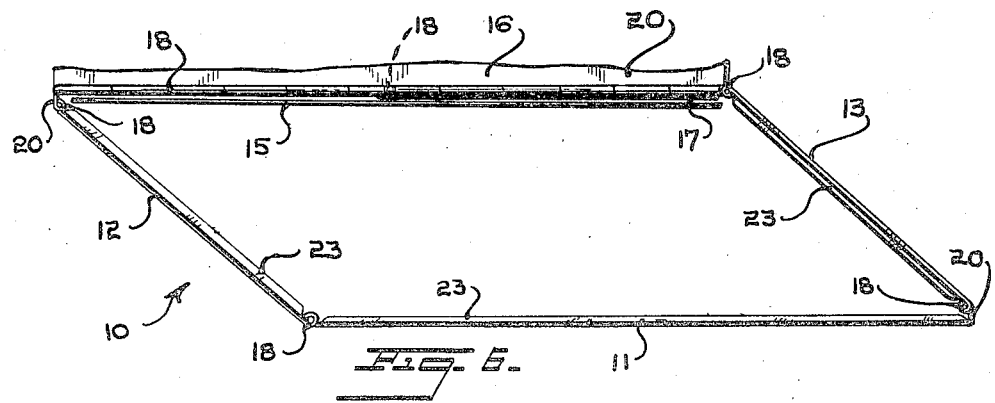

Jan. 10, 1950        H. A. ABBOTT        2,494,275
COLLAPSIBLE CRATE
Filed Jan. 5, 1946                        3 Sheets-Sheet 3
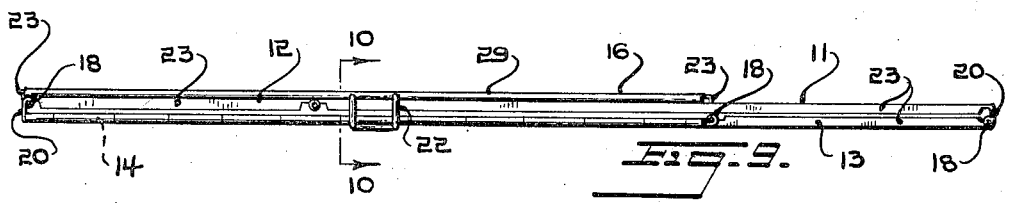
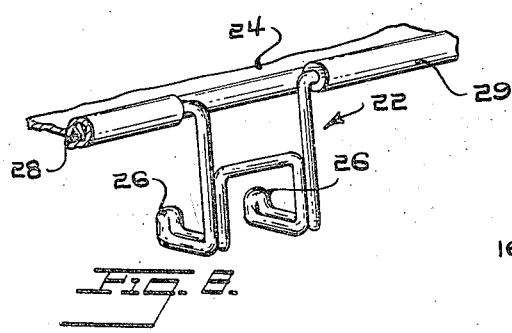
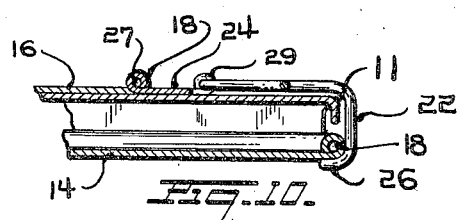
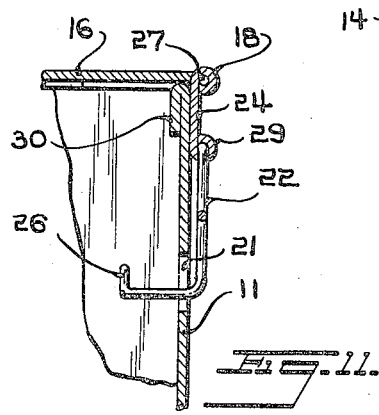
INVENTOR
HARRY A. ABBOTT
BY
ATTORNEY Patented Jan. 10, 1950

2,494,275

UNITED STATES PATENT OFFICE 2,494,275

COLLAPSIBLE CRATE

Harry A. Abbott, Little Neck, N. Y.

Application January 5, 1946, Serial No. 639,332

1 Claim. (Cl. 217—14)

This invention relates in general to a container and in particular to a collapsible large container such as, a crate for the storage and transportation of eggs and the like.

It is customary to store and transport eggs and similar breakable articles in sturdy wooden crates or the like, whereby the eggs are protected against breakage and made convenient for carrying in quantity. Unfortunately, however, these crates are bulky and comparatively unwieldy when empty, occupying as much space as when full and being unadapted for convenient return to a refilling station. Accordingly this invention proposes a large type container which is sturdy and strong for packing and transporting fragile articles and which is convenient in size and shape for handling while empty.

It is a further object of this invention to provide an egg crate which protects eggs during storage and transportation and which is convenient in size and shape when empty.

It is another object of this invention to provide a collapsible container for packing articles during storage and transportation.

It is still another object of this invention to provide a collapsible egg crate.

Additional objects of the invention as well as the use, operation and construction thereof will in part be obvious and will in part become apparent from the following disclosure:

For further comprehension of the invention, and of the objects and advantages thereof, reference will be had to the following description and accompanying drawings, and to the appended claim in which the various novel features of the invention are more particularly set forth.

In the accompanying drawing forming a material part of this disclosure:

Fig. 1 is a perspective view of an egg crate according to one embodiment of this invention.

Fig. 2 is a rear elevational view of the article of Fig. 1, showing the article in the collapsed condition.

Fig. 3 is a top plan view of the article shown in Fig. 1, with the cover thereof removed to permit viewing of the inside thereof.

Fig. 4 is an end elevational view of the container shown in the previous figures.

Fig. 5 is a perspective view of the cover for the container shown in the previous figures.

Fig. 6 is a top plan view of the crate shown in Fig. 1 in the partially folded condition.

Fig. 7 is a fragmentary view of a front upper corner of the crate shown in the previous figures taken in section along the line 7—7 in Fig. 3.

Fig. 8 is a perspective view of the lock hook and its support.

Fig. 9 is a front elevational view of Fig. 2.

Fig. 10 is a fragmentary enlarged vertical sectional view, taken on the line 10—10 of Fig. 9, showing the crate in folded position.

Fig. 11 is a fragmentary vertical sectional view showing the locking hook in engagement when the crate is in operative position.

Referring to the figures in detail, Fig. 1 shows the egg crate according to one form of the invention wherein there is provided a collapsible container which is sturdy when set up and which is readily folded to a minimum of space without being disassembled.

The crate, generally designated 10, comprises a front wall 11, two side walls 12 and 13, a rear wall 14, a bottom 15 (refer to the following figures), a cover 16, and an inner vertical panel 17 substantially parallel to side walls 12 and 13 when the crate is being utilized. These walls, panels, and similar members are hinged together into one integral unit which can be neatly folded into a compact body.

The back wall 14 comprises a stiff, firm board-like member whose size and shape is that of the crate as a whole. At one end of the wall 14 are a series of hinge loops 18 which are adapted to receive a hinge rod (not shown in the figure). These loops are spaced apart by a distance roughly equal to their length, to receive a mating set of loops 18 on the end wall 13. In this way, loops from the rear wall 14 and loops from the end wall 13 are interspaced to receive a hinge rod, whereby there is formed a folding hinged joint between the two wall members.

At the other end of the rear wall 14 is a narrow ledge 20 extending forward from the wall at right angles thereto, optionally integrally mounted on the rear wall and extending from the rear wall for a slightly greater distance than twice the thickness of the board composing the wall. This ledge 20 terminates in spaced hinge loops 18 running parallel with the wall 14 and positioned along the ledge in a similar manner to the previously described loops. These loops interconnect with mating loops 18 on side wall 12 which is thereby mounted thereon.

Front wall 11 is similar in size and construction to the rear wall 14, having hinge loops 18 at one end mating with loops in side wall 12, and having at the other end a ledge 20 (see also Fig. 7) which terminates in loops mating with loops on end wall 13. At the center of the front wall, near its top edge is an opening 21 to receive a fastening hook 22 on the top cover 16 as will be further described hereinafter. Optionally there are other openings of a similar nature (not shown in the figure) to receive other fastening hooks.

The side walls 12 and 13 of the crate 10 are flat board-like members whose size and shape generally conforms with and determines the end-on shape of the crate. These side walls terminate along their vertical edges in hinge loops 18 as have been previously described, whereby they are joined to the front and back walls.

The bottom 15 of the crate is a flat member having the shape of the top plan of the container, and is hinged along its rear edge in a manner similar to that previously set forth, and thereby joined to the lower edge of the rear wall 14. Optionally, the lower edge of the rear wall 14 terminates in a ledge 20 (not shown in the figures) which is similar in shape to ledge 20 at the edge of rear member 14, and which extends forward from the lower edge of wall 14 for a distance roughly equal to the thickness of the wall 14, and which is hinged to receive the bottom 15 of the crate.

The purpose of the various ledges 20 will become apparent in the following description wherein it will be shown that these ledges permit the compact and smooth folding of the container 10.

In the open or crate-like condition as shown in Fig. 1, the bottom 15 of the container 10 rests on at least one fold or support 23 (refer to Fig. 6) along at least one of the front and side members 11, 12 or 13, and extending at least partially across the lower edge thereof. This support serves to retain the bottom 15 in the correct position and to support the weight of the contents of the container, and accordingly in the preferred form of the invention there is provided one such support 23 extending substantially across the lower edge of each of the side and front members, totalling three such supports in all.

Optionally the container 10 is also provided with an inner panel 17 which serves to divide the container into two sections, according to conventional practice in connection with egg crate construction. This panel extends substantially from the top of the container to the bottom and substantially from the back to the front thereof. The rear end of this panel 17 is provided with hinge loops 18 which are similar to those hereinbefore described. A mating set of hinge loops 18 is mounted vertically along the center of the rear wall 14, dividing the wall into two sections of substantially equal width. The panel 17 and the rear wall 14 are joined together in a hinge joint through these loops 18.

The cover 16 comprises a flat board-like member whose shape substantially conforms with the plan of the crate, having along its front and rear edges a series of hinge loops 18. At the rear edge of this member is a ledge 20 having hinge loops 18 along either edge whereby it is hinged to the cover 16 and to the rear wall 14 through similar and mating loops on each of said members. This ledge is roughly three times the thickness of rear wall 14. Along the front edge of cover 16 is a flap 24, hinged thereto as hereinbefore set forth, and carrying hook 22 which was previously described in passing. This flap 24 extends substantially the length of the cover 16 and is substantially three times the thickness thereof.

Along the ends of the cover are folds or supports 23 which are positioned to fit outside the side walls 12 and 13 and to bear against said walls whereby the walls are retained in their correct positions when the cover is closed.

The cover is adapted to be retained in the closed position by means of hook 22 which comprises, for example, a wire or other strong, somewhat flexible material shaped to have two hook-like prongs 26 spaced apart and adapted to pass through and engage opening 21 in the front wall, and to pass one on either side of panel 17, retaining said panel in position within the crate.

For use as a packing container, the container 10 is opened to the position shown in Fig. 1, and it is filled with articles such as, eggs, together with whatever packing materials are needed or are conventionally used therewith. After the crate has been emptied, it is folded as follows:

The cover is raised, panel 17 is folded to one side, the bottom 15 then folded upward against the panel and the rear wall 14, and the side walls 12 and 13 and the front wall 11 are folded to one side as a unit, whereby the walls of the container are compressed and folded together. The cover 16 is then folded forward over the front wall, and flap 24 is folded over the bottom edges of the walls, closing the folded container and securing it in the folded condition.

Fig. 2 shows the folded container 10 from the rear view, showing various of the parts and pieces previously described.

Fig. 3 shows the top plan of the container 10, illustrating how the panel 17 is folded to the side in the initial phase of the collapsing process.

Fig. 4 shows the crate 10 from an end view, showing more clearly the position of supports 23 along the end of cover 16, and showing the position and structure of ledge 20 along the edge of rear wall 14.

Fig. 5 shows in greater detail the structure of the cover and its adjacent ledge 20 and flap 24. Reference is made to the description of the cover in connection with Fig. 1.

Fig. 6 shows the top plan of the container 10 in an intermediate stage in the folding operation. In this view, panel 17 is folded to the right against the rear wall 14, and bottom 15 is folded up thereover. The unit of side walls 12 and 13 and front wall 11 is partially folded to one side, showing the movement of these parts in the folding operation.

Fig. 7 shows in greater detail the structure of the corners of the container 10. Reference is made to the description in connection with Fig. 1. In this figure there is seen the position of ledge 20 along the end of front wall 11, and hinge loop 18 mounted thereon. Likewise, there is shown a hinge rod 27 joining cover 16 to flap 24 through other hinge loop 18. On flap 24 there is also shown a reinforcing rod 28 positioned within a fold 29 along the other edge of the flap, away from the hinged joint. This rod 28 is so shaped as to form hook 22 at a midway point along the free edge of flap 24. Likewise, there is shown in this figure reinforcing folds 30 along the free edges of front wall 11 and side wall 13.

The wall and panel members and the like of the crate hereinbefore described are constructed of a strong, sturdy, boardlike material. There may be used, for example, wood, metal, plastic, strong pressed fiber board, or the like. The material may be plain or it may be corrugated or otherwise strengthened, for example by means of cross members 31 indicated in outline in the figures. It is to be understood that various stiffening means such as embossing will be used to add structural strength to the container. Likewise, there may be wire stiffening or the like at various positions around the container.

It is further to be understood that the container will, in many specific instances have ventilation holes in at least one of the walls to provide constant circulation of air for the better storage and preservation of the contents.

Additionally, there will be provided in many instances handles preferably on the side walls 12 and 13 for the more convenient handling of the containers, particularly when the container is full.

All these, as well as numerous additional modifications, variations and refinements in structure of the container will be understood to be included within the scope of the invention.

Having thus described my invention, what I claim as new, and desire to secure by United States Letters Patent is:

A collapsible container having a back wall, a front wall, and two side walls hingeably mounted together, a bottom panel hingeably mounted on the back wall and positioned to rest on at least one support mounted on one of the front and side walls, a top cover hingeably mounted on the back wall and positioned to close the top of the container, and an inner panel mounted vertically and hingeably on the back wall, medially thereof, and adapted to extend substantially to the front wall, said walls, top, and panel being adapted to be folded in an integral condition, and means mounted on the cover for securing the container in a closed position and supporting the inner panel in position with respect to said front wall, said means comprising a two pronged hook positioned to project through and engage an opening located centrally in the front wall on both sides of the normal position of said inner panel when the cover is closed, said prongs of said pronged hook being positioned to engage opposite sides of said inner panel.

HARRY A. ABBOTT.

REFERENCES CITED

The following references are of record in the file of this patent:

UNITED STATES PATENTS

| Number | Name | Date |
|---|---|---|
| 66,881 | Parks | July 15, 1867 |
| 806,448 | Allison | Dec. 5, 1905 |
| 866,621 | Chambers | Sept. 24, 1907 |
| 953,581 | Bayne | Mar. 29, 1910 |
| 1,401,993 | Leonard | Jan. 3, 1922 |
| 1,761,325 | Burson | June 3, 1930 |
| 1,972,483 | Hartson | Sept. 4, 1934 |